United States Patent
Mehren

[19]

[11] Patent Number: 4,595,071
[45] Date of Patent: Jun. 17, 1986

[54] HYDRAULIC POWER-ASSISTED STEERING GEAR FOR VEHICLES

[75] Inventor: Herbert Mehren, Stuttgart, Fed. Rep. of Germany

[73] Assignee: Daimler-Benz Aktiengesellschaft, Fed. Rep. of Germany

[21] Appl. No.: 724,904

[22] Filed: Apr. 19, 1985

[30] Foreign Application Priority Data

Apr. 19, 1984 [DE] Fed. Rep. of Germany ....... 3414843

[51] Int. Cl.$^4$ ............................................. B62D 5/10
[52] U.S. Cl. ..................................... 180/132; 180/141
[58] Field of Search ............... 180/132, 141, 142, 143; 91/368; 74/388 PS

[56] References Cited

U.S. PATENT DOCUMENTS

| | | | |
|---|---|---|---|
| 3,373,631 | 3/1968 | Biabaud | 180/141 |
| 3,426,612 | 2/1969 | Biabaud | 180/141 |
| 3,876,030 | 4/1975 | Komamura et al. | 74/388 PS |
| 4,410,193 | 10/1983 | Howard | 180/132 |

Primary Examiner—John J. Love
Assistant Examiner—Donn McGiehan
Attorney, Agent, or Firm—Barnes & Thornburg

[57] ABSTRACT

The present invention concerns a hydraulic power-assisted steering gear for vehicles. A servo-cylinder is controlled by means of a control valve whose control spool can be deflected, independently of the position of the driven link, by actuation of the steering wheel from a neutral position corresponding to a steady driving condition. In addition, the control position of the control spool can also be adjusted automatically by means of a return device and under the action of a displacement force in such a way that when the steering wheel is released, the wheels of the vehicle are caused to return automatically from a deflected position into the straight position. A corresponding displacement of the control spool is achieved by subjecting its end surfaces to hydraulic pressure. The control of the corresponding pressure head is controlled as a function of the deflection angle by means of a further control valve. The return device is a particularly simple and robust device of small installation dimensions which also has the capability of achieving any given variation of return force with deflection angle.

14 Claims, 4 Drawing Figures

HYDRAULIC POWER-ASSISTED STEERING GEAR FOR VEHICLES

BACKGROUND AND SUMMARY OF THE INVENTION

The present invention relates to hydraulic power-assisted steering gear for vehicles, and particularly to an automatic wheel return system for use with a power-assisted steering gear.

In order to restrict the steering forces at the steering wheel, the steering gear is equipped with hydraulic power assistance particularly in the case of heavy vehicles. The deflected wheels are automatically returned to the straight position, at least when there is sufficient travelling speed, by appropriate axle geometry or by reverse rotation of the steering wheel. Under any travelling situation and even when the vehicle is at rest, the wheels can be returned automatically into the straight position by hydraulic means using a return device controlling the servo-cylinder in accordance with the existing steering deflection, without appropriate axle geometry or manual steering being necessary. An appropriate return device is described in German Unexamined Published Patent Application (DE-OS) No. 3,218,844. The threaded spindle of the steering gear is rotationally restrained in the steering geer housing by means of a cross recess coupling but it can execute small control displacements axially relative to the steering column. By this means, the threaded spindle can, on the one hand, transmit steering torques to the drop arm and, on the other, act as an axially movable control valve spool for controlling the flow of pressure medium to the servo-cylinder. During steering operations, the threaded spindle is displaced axially by a control displacement against the force of centering springs and carries, connected to it, a valve bushing which moves in a control housing. The centering springs are supported on a collar which is guided with an axial helical movement in a thread on the threaded spindle but which is supported on the steering gear housing so that it cannot rotate. After the conclusion of the steering movement and after the steering wheel has been released, the preloaded centering springs place the threaded spindle and the valve bushing beyond the neutral position in a control position corresponding to reversal of the steering gear so that the previously unloaded pressure space of the servo-cylinder now receives pressure. The return movement is concluded when the axial displacement of the collar, which depends on the amount of steering deflection, has again disappeared and the valve bushing finally takes up its neutral position. The mechanical springs of the type used are, as is known, linear work storage devices so that the force acting on the control spool can, in turn, change only linearly. This force is also felt, either diminished or magnified, as a return force at the steering wheel changing linearly with the steering deflection. Steering wheel forces increasing linearly with the steering deflection, however, do not provide steering with a satisfactory feel. The return force at the wheels also alters linearly with the steering deflection because the displacement path of the threaded spindle, which acts simultaneously as the control spool, determines the pressure to which the servo-cylinder piston is subjected. For good centering of the wheels in the straight position, however, it is desirable that a high return torque should act, particularly at small deflections of the wheels from the straight position, and that this return torque should not increase linearly with increasing steering deflection. A further disadvantage is that the way in which the force varies with deflection angle is fixed on installation of the springs and can only be changed by substantially dismantling the steering gear. Another disadvantage is that hysteresis effects can arise due to the mechanical mode of action of the return device and this makes exact setting of an unambiguous steering position for travelling in a straight line impossible. Furthermore, the special mode of operation of the steering gear (since axial movement of the threaded spindle are necessary) does not permit the working spaces of the servo-cylinder to be located around the threaded spindle in a space-saving manner.

The return device described in German Unexamined Published Patent Application (DE-OS) No. 2,324,347 for a rack steering gear again agrees in principle with the mode of operation of the return device described above. A centering spring preloaded to suit the steering gear and the steering deflection is again used, after the steering wheel has been released, to displace the control valve spool of the steering gear into a control position corresponding to a return movement into the straight position of the wheels in order, by this means, to reverse the way in which the working spaces of the servo-cylinder are subjected to pressure. The preloading of the centering spring necessary for this purpose is achieved by means of a threaded section driven by the steering column; on this threaded section, there is a nut which is axially supported by springs on a casing which is located parallel to the control spool and is solidly connected to it. The same disadvantages apply as those already enumerated for the previously described return device.

Another return device known from German Unexamined Published Patent Application (DE-OS) No. 2,331,566 is also used on a rack steering gear. Between a control spool, which can be deflected from its neutral position as a function of the steering direction, and its housing, there is an additional axially movable casing spool whose axial position is controlled as a function of the position of the rack. If there is a deflection due to actuation of the steering wheel, the control spool is displaced through a control distance against the force of a centering spring in the corresponding direction and corresponding passages are opened so that the working spaces of the servo-cylinder can be subjected to pressure. When the rack is displaced, the casing spool is also driven along into a corresponding position which does not, however, disturb the flow of pressure medium which has been initiated. After the conclusion of the steering wheel rotation, the control spool returns to its neutral central position while the casing spool is retained in its position, for example by a frictional connection. In this position of the casing spool and the control spool, passages are now open and by means of these, the servo-cylinder can be switched over. The casing spool resumes its neutral position only when the wheels are in the straight position. The adjustment of the casing spool takes place, in each case, by means of a mechanical setting device, which can also be controlled hydraulically. A disadvantage is that expensive and accurately fitting precision parts are necessary so that the moving parts can slide over one another with accurate fits and be positioned in the correct axial positions. A mechanism of this type, which is expensive, complicated and subject to wear in use, is of course subject to damage. The failure of the setting mechanism of the spool can lead to dangerous driving situations because, in the case of unfavorable spool positions, the wheels may be displaced into an unexpected position.

From German Unexamined Published Patent Application (DE-OS) No. 3,220,922, it appears as known that a control spool of a power-assisted steering gear operates with each of its end faces in a reaction chamber of the valve housing and that the reaction chambers are, on the one hand, connected via a constant throttle to a short-circuit connection. The reaction chambers are, on the other hand, each connected via a non-return valve, opening in the direction of the reaction pressure chamber, to one operating chamber each of the servo-cylinder. A pressure line leads away from the short-circuit line via an adjustable throttle to a reservoir. By altering the throttle cross-section of the adjustment throttle as a function of the travelling speed, a differential pressure corresponding to the differing pressures in the operating chambers builds up across the control spool during steering movements and this differential pressure can be felt as a manual force at the steering wheel. In the case of this hydraulic circuit, however, it is not the intention and it is also not possible to effect an automatic return of the wheels from a deflected position to the straight position because, after the control spool has returned to its neutral position (which is assumed for every constant travelling condition even if the wheels are deflected), the pressure in the operating chambers of the servo-cylinder and the reaction pressure chambers are balanced. However, automatic displacement of the control spool from the neutral position into a control position corresponding to a return steering position is necessary to provide automatic return movement of the wheels. In order to produce manual forces at the steering wheel, a large number of possible devices for producing an axial force at the control spool are, in addition, known from the literature. However, the automatic return of the wheels requires fundamentally different solutions.

One object of the present invention is to provide a simple and robust device of small installation dimensions for the automatic hydraulic return of vehicle wheels into the straight position.

Another object of the present invention is to generate manual steering forces and wheel return forces that vary non-linearly as a function of the steering deflection angle with the control spool of a power-assist valve system being subjected to corresponding forces. In addition, the force variation should also be alterable by simple means.

According to the present invention, a hydraulic power-assisted steering gear is provided for use with a vehicle having steerable wheels. The steering gear includes means for turning the steerable wheels between a straight position and at least one deflected position, manual steering means for operating the turning means in response to an instruction from a vehicle operator, power-assisted steering means for assisting the manual steering means in operation of the turning means, and return means for returning automatically the steerable wheels from a deflected position to the straight position.

The power-assisted steering means include hydraulic means for operating the turning means using a flow of pressurized working medium, a valve housing in fluid communication with the hydraulic means, and a control valve spool slidably received in the valve housing. The control valve spool is movable in the valve housing between a straight wheel position, a first steering direction position, and an opposite second steering direction position. In preferred embodiments of the present invention, the first steering direction position corresponds to a right-handed turn of the vehicle and the opposite second steering direction position corresponds to a left-handed turn of the vehicle. The turning means is operated by the manual steering means with assistance from the power-assisted steering means when the control valve spool is in either of the first or second steering direction positions.

In preferred embodiments of the present invention, the return means includes means for sensing a selected deflected position of the steerable wheels and means for continuously urging the control valve spool toward the other of the first and second steering direction positions when the steerable wheels are turned to a deflected position due to operation of the turning means so that the steerable wheels are returned to a straight position. Desirably, the selected deflected position corresponds to one of the first and second steering direction positions of the control valve spool. In preferred embodiments of the present invention, during operation of the return means the vehicle operator senses a magnified or diminished manual force indicative of the tendency of the turning means to return to its straight position via the manual steering means.

The control valve spool must be deflected from its neutral position in order to cause the operating chambers of a servo-cylinder housing the turning means to be subjected to different pressures for a steering maneuver. This is accomplished by subjecting the control spool to an external force. In the case where the deflected wheels have to return automatically (i.e. without steering support from the steering wheel even with the vehicle at rest) into the straight position, the control spool must be displaced automatically into a control position (i.c. first or second steering direction position) away from the neutral position (i.e. straight wheel position), this control position being in the opposite direction to the control position which was necessary to bring about the steering deflection. For this purpose, the control spool is continually subjected to pressure on its end surfaces while the wheels are deflected, the pressure action producing an axial force. If a corresponding force at the steering wheel does not act against this axial force, the operating chambers of the servo-cylinder are subjected to pressure corresponding to a return movement of the wheels and the wheels are hydraulically returned to the straight position.

A change to the pressure difference acting on the control spool also causes a change to the manual steering forces felt and, in addition, an alteration to the return torque at the wheels because the operating chambers of the servo-cylinder are subjected to pressure as a function of the control position of the control spool. The axial force derived from the pressure difference at the control spool acts against preloaded springs centering the control spool in a central position. In addition, the manual steering forces and wheel return torques can be easily changed by, for example, influencing the pressure level of the pressure medium by means of throttling.

The pressure difference at the control spool is controlled as a function of the steering angle by using a linear displacement/pressure or an angular displacement/pressure converter as the control element which senses the linear or angular displacement at the control linkage or steering column. The converter can, for example, interact with a pilot valve which, acting as an adjustable throttle, controls the flow of pressure medium to and from the spaces subjected to pressure at the end faces of the control valve spool.

The high degree of operational safety of the return device is advantageous, due to the use of simple constructional elements. In addition, manufacture of steering devices with a return device is possible at a favorable cost. Furthermore, these devices have practically the same external dimensions as previous steering devices without a return device. The fact that the force on the control spool, and also the resulting forces at the steering and road wheels, can be adjusted to give any variation with steering angle is also advantageous. By this means, for example, it is possible to provide relatively high return forces even at small steering angle deflections from the straight position and to maintain a curve shape which flattens with increasingly large steering angles. This makes particularly exact guidance of the wheels in the straight position possible. Such a return device can also be used in an advantageous manner in the steering devices of track guided vehicles in order, particularly in sharp curves, to preload the wheels in the direction of a track guidance flange at the outside of the curve, along which flange the vehicle has to be guided through the curve on one side.

Further objects, features, and advantages of the present invention will become more apparent from the following description when taken with the accompanying drawings which show, for purpose of illustration only, an embodiment in accordance with the present invention.

BRIEF DESCRIPTION OF THE DRAWING

FIGS. 1, 1A and 1B show a hydraulic circuit diagram for power-assisted steering gear, together with diagrammatic views of an axial section through the steering gear, axial sections of a control valve having a longitudinal axis aligned in transverse relation to the longitudinal axis of the steering gear, and a pilot valve for controlling the automatic return of the wheels into the straight position.

DETAILED DESCRIPTION OF THE DRAWING

Figure 1:
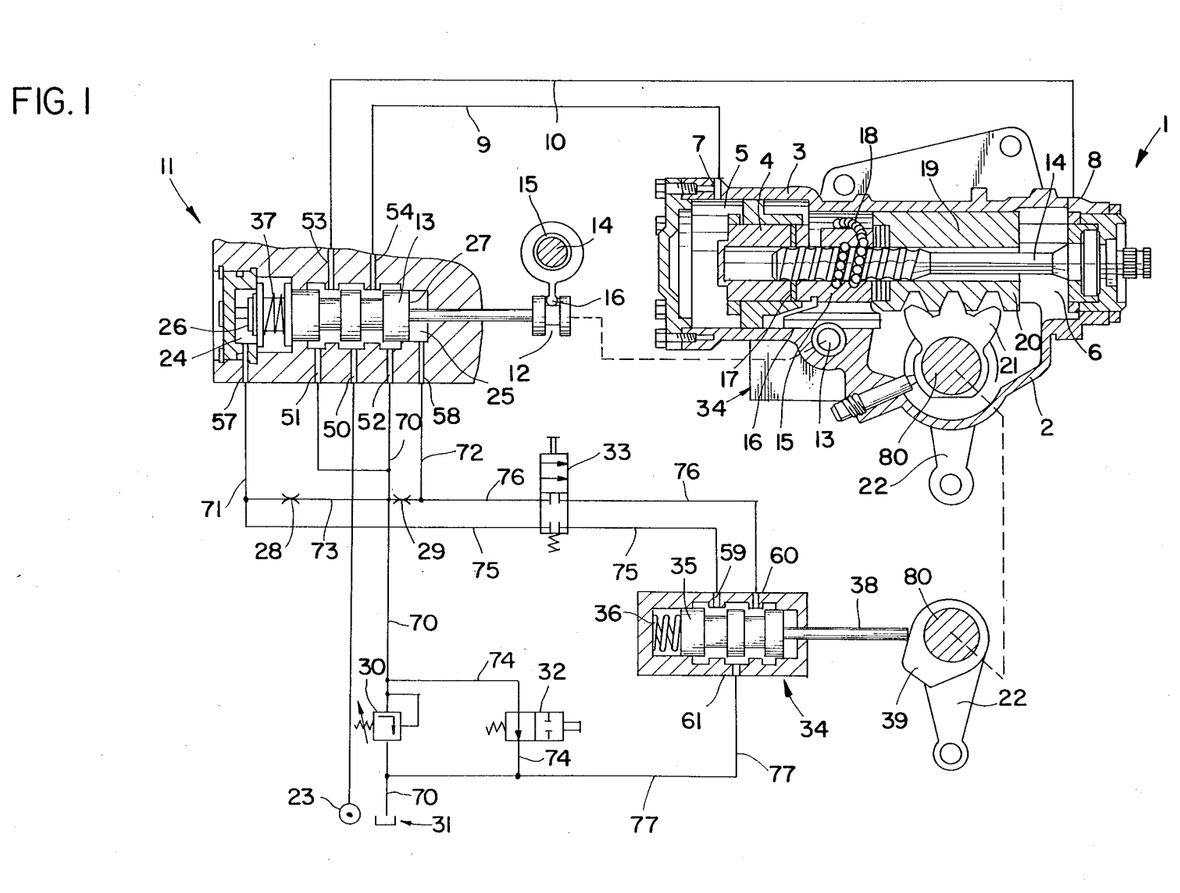

The power-assisted steering gear 1 possesses a steering gear housing 2, which is also arranged to be the servo-cylinder 3 for an operating piston 4. The operating piston 4 separates two operating chambers 5, 6 from one another, these operating chambers 5, 6 being connected via connections 7, 8 and pressure medium lines 9, 10 to a control valve 11 having a control spool 13. The control valve 11 is integrated into the steering gear housing 2 and has an axis which extends transverse to the direction of extension of the steering spindle 14. The control spool 13 has an annular groove 12 which engages the steering finger 16 which is integral with the steering nut 15. The steering nut 15 is supported so that it can be screwed on the steering worm 17 by means of a circulating ball system 18. The steering spindle 14 is held in the steering gear housing 2 so that it can be rotated but cannot be displaced axially. The steering nut 15 can only be moved relative to the steering worm 17 in the axial direction of motion in conjunction with the operating piston 4 and a rack section 19, which is also guided on the steering spindle 14. The rack section 19 carries a rack profile 20 at its periphery and this interacts with a tooth segment 21 which is torsionally connected to a drop arm 22 which is pivotable about pivot 80.

A pressure medium pump 23 is driven by the driving engine of the motor vehicle and is always connected to a connection 50 of the control valve 11. The connections 51 and 52 of the control valve 11 act as drainage holes for the pressure medium coming from the pressure medium pump 23 or from the operating chambers 5, 6 of the servo-cylinder 3. The connections 51 and 52 are connected to a common drain 70 which leads to the reservoir 31. Pressure medium can reach the connections 7, 8 of the servo-cylinder 3 and the operating chambers 5, 6 via the connections 53 and 54 of the control valve 11 and the lines 9, 10. The connections 57 and 58 lead to the end chambers 24, 25 in the valve housing. End surfaces 26, 27 of the control spool 13 protrude into these end chambers 24, 25. The connections 57 and 58 are connected together via lines 71, 72, and 73, two constant throttles 28 and 29 being inserted in the line 73. The line 73 also has a connection to the return line 70 in the region between the constant throttles 28, 29.

Viewed in the flow direction, a pressure regulating valve 30 is located behind the branch and this valve serves to raise the pressure of the pressure medium return flow in the line section upstream of it. It keeps the hydraulic pressure in the corresponding line section of the return line 70 constant, independent of the volume flow, provided the 2/2-direction valve 32 in a by-pass line 74 parallel to the pressure regulating valve 30 is not opened. Each of the end chambers 24, 25 is connected directly to the connections 59 and 60 of a pilot valve 34 via lines 75, 76 without the inclusion of the constant throttles 28, 29. The lines 74 and 76 can be interrupted by means of a 4/2-direction valve 33. The pilot valve 34 is connected directly to the reservoir 31 via a connection 61 and the return lines 77 and 70.

The control valve 11 and the pilot valve 34 are similarly constructed and both operate on the principle of the open center, each having four control edges. An axial displacement of the control spool 13 or 35 leads, in each case, to a reduction or increase in the flowthrough cross-sections between opposite connections, which results in throttling or in an increase in the volume flow and reduction or increase in the working pressures behind the throttle cross-sections. The control spools 13, 35 are shown in a central neutral position, from which, in each case, they can only be deflected against the force of preloaded centering springs 36, 37. The axial location of the control spool 35 is determined by the position of the control cam 39. The control spool 35 is biased against the control cam 39 by the centering spring 36.

The control spindle 14 is subjected, via the steering column, to a torque due to rotation of the steering wheel (not shown) to the left or to the right. In the case of small rotational movements and, in particular, in the case of high speeds, the steering resistance at the drop arm 22 and hence the expenditure of force to displace the rack section 19 is so small that the control spool 13 remains in the neutral position (i.e. there is no power assistance from the servo-cylinder 3). It is only when the force with which the steering finger 16 bears on the centering springs 37 becomes so large that the preloading of the latter is overcome that the control spool 13 is deflected from its central neutral position. In the neutral position of the control spool 13, the pressure medium flows directly to the drain via the connections 51 and 52. If, for example, the control spool 13 is deflected towards the left, the pressure medium can flow via the connection 50 from the pressure medium pump 23 to the connection 54 and from there into the operating chamber 5. In contrast, the passage cross-section from the connection 50 to the connection 53 is reduced, as is the passage via the connection 52 to the reservoir 31. In contrast, the throttle cross-section in the passage from the connection 53 to the connection 51 are opened wider so that pressure medium can flow unhindered from the operating chamber 6 of the servo-cylinder 3 to the reservoir 31. Due to the pressure difference, the operating piston 4 is displaced towards the right, which would correspond to a steering deflection to the right. After the desired steering deflection has been attained, further flow of pressure medium and the maintenance of the pressure difference at the operating piston 4 is no longer necessary and the control spool 13 returns again into its neutral central position, because there is no longer any longitudinal force on the control spool 13 via the steering finger 15 and the annular groove 12. It is only when steering occurs in the opposite direction that the control spool 13 is deflected into the opposite steering position—if power assistance is, in fact, required.

The present invention also, however, makes it possible to return the wheels of the vehicle automatically from the deflected position into the straight position without steering assistance by the driver. For that purpose, the control spool 13 is subjected continually to an axial force when the wheels are located in a position deflected from the straight position. The axial force is produced by subjecting the end chambers 24, 25 of the control valve 11 to different levels of pressure. Furthermore, the axial force at the control spool 13 resulting from this pressure difference can be felt by the driver as a magnified or diminished manual force tending to return the steering wheel to the central position. It is necessary to act against this force to prevent automatic return of the wheels into the straight position. If the steering wheel is released, however, the axial force acting on the control spool 13 displaces the control spool 13 into a control position which is precisely in a second direction opposite to the first direction of displacement necessary to initate the power-assisted steering deflection.

The direction and magnitude of the pressure difference at the control spool 13 govern the operation of the automatic return system of the present invention and are controlled by means of the displacement/pressure convertor design of the pilot valve 34. For this purpose, it is necessary that the 2/2-direction valve 32 should be closed and the 4/2-direction valve 33 opened. All of the returning pressure medium flows to the reservoir 31 via the pilot valve 34 as long as a specified pressure level is not exceeded in the return line 70 between the connections 51 and 52 of the control valve 11 and the pressure control valve 30.

The pilot valve 34 acts like two throttles which are adjusted in opposite directions in the lines 75 and 76. Depending on the displacement of the pilot valve 34 from its central position, the passage cross-sections between the connections 59 and 61 and between 60 and 61 are increased and decreased, respectively, or visa versa. If, for example, the drop arm 22 is located in a position pivoted towards the left in a clockwise direction about pivot 80 (in the plane of the drawing in the figure), which corresponds to deflected wheels and a displacement to the right of the operating piston 4 of the servo-cylinder 3, the control spool 35 of the pilot valve 34 is located in a position deflected towards the left due to against the force of the centering spring 36.

The magnitude of the displacement of the control spool 35 depends on the steering deflection and the design of the external contour of the control cam 39 which is torsionally connected to the drop arm 22. The cam 39 is sensed by cam follower 38 of the control spool 35 of the pilot valve 34. In this position of the control spool 35, the flow of pressure medium via the lines 75 and 77 to the reservoir 31 is throttled through the pilot valve 34, while the flow from the line 76 to the line 77 is not throttled to such a large extent. Depending on the extent of opening of the oppositely adjusted throttle cross-sections, different pressures build up in the lines 75, 71 and 76, 58 due to the accumulation of the pressure medium flowing back to the reservoir. The pressure medium source for this purpose is the pressure medium build-up in the line section of the return line 70, this pressure medium being connected to the lines 71 and 72 via the constant throttles 28 and 29. A separate pressure medium pump could act as the pressure medium source instead of the pressure medium subject to pressure in the line section. In the position described, in which the control spool 35 of the pilot valve 34 is displaced towards the left, there is, therefore, a larger pressure in the line 75 than in the line 76.

Pressure can propagate into the end chamber 24 since the line 75 is connected to the end chamber 24 via the line 71 and the connection 57, just as the pressure in the line 76 can propagate via the line 72 and the connection 58 into the end chamber 25. The axial force due to the pressure difference tends to displace the control spool 13 towards the right. If the existing steering configuration with the control spool located in the neutral central position is not maintained by an opposing force at the steering wheel, the steering wheel is released. The control spool 13, which was displaced towards the left by the action of the steering nut 15 in order to achieve the previous steering deflection, can then be displaced towards the right from the existing central position. This reduces the throttling resistance in the passage through the control valve 11 from the connection 50 to the connection 53, i.e. the pressure of the pressure medium pump can propagate into the operating chamber 6 with less throttling. At the same time, the passage between the connections 52 and 54 is opened so that pressure medium can flow unhindered from the operating chamber 5 through the control valve 11. In this way, a pressure difference occurs at the operating piston 4 and this displaces the operating piston 4 into a position which straightens the wheels. In the straight position of the wheels, the drop arm 22 is then located in the position shown, in which the throttle cross-sections in both passages are opened equally widely by the pilot valve 34 so that the pressure levels in the end chambers 24 and 25 are the same. The control valve 11 is then also located once again in its neutral central position shown.

Automatic wheel return can also be cancelled by switching the directional valves 32 and 33 into the switching positions shown. The return flow of the pressure medium from the control valve 11 does not then occur via the pilot valve 34; in this case the return is via the line 70 and the by-pass line 74 to the reservoir 31. So that the end chambers 24, 25 can be filled or emptied during displacements of the control spool 13 corresponding to steering movements, they must be connected to the return line 70. The presence in the lines of the constant throttles 28 and 29 then has a damping effect on the movement of the control spool 13.

As already mentioned, the return torque at the wheels can be easily influenced by using the magnitude of the pressure difference at the control spool 13, its consequent linear displacement and the opening cross-sections of the throttle positions resulting in turn from this displacement. Similarly, the variation of the manual steering force with steering angle is determined by the pressure difference at the control spool 13. It is therefore possible to produce any given force variations by using end chambers subjected to appropriate pressures. It is also particularly advantageous that the force variation does not have to be designed to have a linear variation with deflection angle. For example, the return torque increases very rapidly for small deflections from the straight position and less strongly for large deflection angles. This provides strong preloading of the wheels in the straight position and good straight line driving characteristics.

Figure 2:
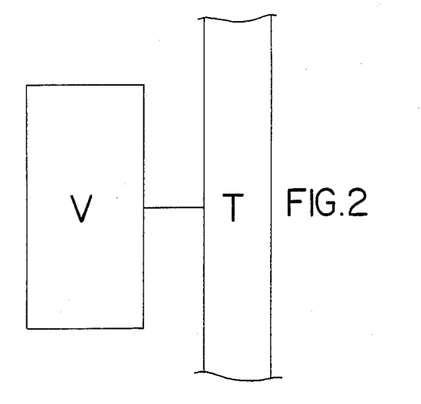
FIG. 2 schematically depicts a return device 34 installed in the steering gear of a track-guided T vehicle V.

The return device can also be used advantageously on the steering device of track-guided vehicles 81 (FIG. 2). A vehicle is generally only guided along the track by the transverse guidance devices associated with the steerable front wheels acting at both sides on built up transverse guidance flanges. In curves, there is a displacement of the rear axle relative to the front axle and in narrow curves, the rear of the vehicle is forced against the transverse guide flange by drag rolls so that the side displacement becomes less. Below certain curve radii, however, the drag rolls can no longer absorb the forces resulting from the side displacement and the guidance trough must be widened. In such widened curve regions, however, the vehicle can only be given one-sided guidance by the transverse guidance device along the flange which is on the outside of the curve at the particular time. So that the vehicle can be guided with certainty along this guidance flange and, in particular, cannot come loose from it if the steering cannot readjust itself rapidly enough on transition to easier curves (which leads to oscillating movements), the steering must be preloaded towards the flange on the outside of the curve. This is easily achieved by applying to track-guided motion the circuit of the hydraulic return device according to the invention. In the deflected position, the operating piston 4 of the servo-cylinder 3 is then continually subjected to a pressure difference which produces a wheel torque onto the flange on the outside of the curve. The torque acting on the wheels is absorbed by the transverse guidance devices. As already mentioned, the return device can be canceled by appropriate switching of the directional valves 32 and 33 when leaving the guided track. However, the resulting manual steering force can also be overridden at any time. In addition, the operation of the power-assisted steering is ensured at all times should the return device fail. The ability to cancel the return device which is dependent on steering deflection can also be advantageous where (apart from particular driving situations, for example when at rest) the hydraulic return is required to be operative but where, starting at certain travelling speeds, the manual steering forces have, for example, to be controlled as a function of the travelling speed. In this case, automatic switching of the valves 32 and 33 would be necessary.

Figures 1, 1A, 1B:
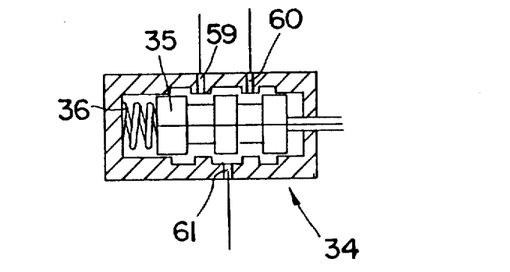
Figure 1A:
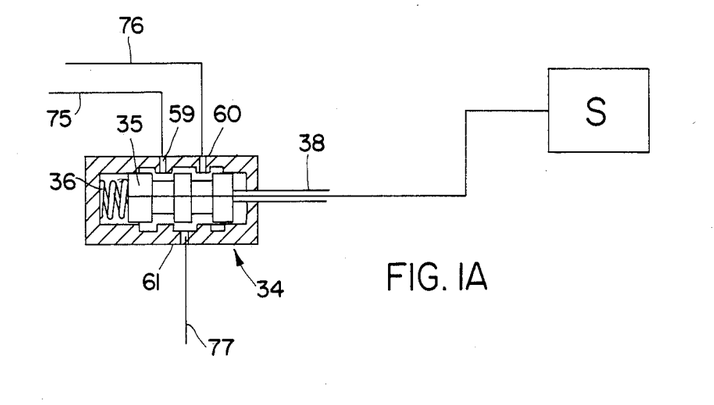
FIG. 1A schematically depicts a source, S, of electrical of magnetic control pulses which selectively actuates the actuating part 35 of valve 34 which acts as an angular displacement convertor.
Figure 1B:
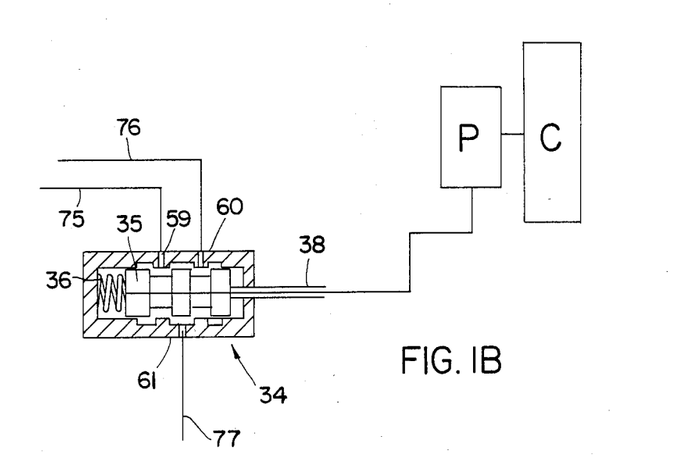
FIG. 1B schematically depicts an arrangement with potentiometer, P, serving as the source of control pulses.

Instead of the mechanical sensing of the steering direction and the steering deflection at the drop arm 22, an appropriately equipped pilot valve 34 could also be controlled by electrical or magnetic pulses. A potentiometer could, for example, be connected to the steering column for this purpose and the electrical readings of the potentiometer would control a magnetically adjustable control spool 35. The pilot valve could also be designed as a jet/impact plate system. The electrical pulse of the linear displacement/pressure or angular displacement/pressure convertor varies the distance of a plate between two opposing nozzles whose outlet openings point towards the impact plate in a manner producing changes in the throttle cross-sections.

Although the invention has been described in detail with reference to certain preferred embodiments and specific examples, variations and modifications exist within the scope and spirit of the invention as described and defined in the following claims.

What is claimed is:

1. A hydraulic power-assisted steering gear for use with a vehicle having steerable wheels, the steering gear comprising means for turning the steerable wheels between a straight position and at least one deflected position, manual steering means for operating the turning means in response to an instruction from a vehicle operator, power-assisted steering means for assisting the manual steering means in operation of the turning means, the power-assisted steering means including hydraulic means for operating the turning means using a flow of pressurized working medium, a valve housing in fluid communication with the hydraulic means, and a control valve spool slidably received in the valve housing and movable therein between a straight wheel position, a first steering direction position, and an opposite second steering direction position, the turning means being operated by the manual steering means with assistance from the power-assisted steering means when the control valve spool is in one of the first and second steering direction positions, and return means for returning automatically the steerable wheels from a deflected position to the straight position, the return means including means for sensing a selected deflected position of the steerable wheels which corresponds to one of the first and second steering direction positions of the control valve spool, and means for continuously urging the control valve spool toward the other of the first and second steering direction positions when the steerable wheels are turned to a deflected position due to operation of the turning means so that the steerable wheels are returned to the straight position and the vehicle operator senses a magnified or diminished manual force indicative of a tendency of the turning wheels to return to straight position via the manual steering means.

2. The steering gear of claim 1, wherein the return means includes means for applying an axial force to the control valve spool to move said spool toward said other of the first and second steering direction positions.

3. The steering gear of claim 1, wherein the control valve spool is formed to include a pair of opposite end faces and means for regulating the flow of pressurized medium to vary the level of assistance provided by the power-assisted steering means, one end face cooperating with the valve housing to define a first end chamber and the other end face cooperating with the valve housing te define a second end chamber, and the return means further includes pilot valve means for elevating the pressure in one of the first and second end chambers to apply a movement-inducing axial force to an end face of the control valve spool to move the control valve spool toward said other of the first and second steering direction positions.

4. The steering gear of claim 3, wherein the manual steering means includes a driven link deflectable from a central position corresponding to the straight position of the steerable wheels along a path, and the applying means subjects the control valve spool to a force proportional to the magnitude and direction of the deflection of the driven link from its central position to cause the driven link to return automatically in the direction of the central position.

5. The steering gear of claim 4, wherein the pilot valve means is one of a linear displacement converter which converts linear displacement of the driven link from the central position into a corresponding pressure and an angular displacement converter which converts angular displacement of the driven link from its central position into a corresponding pressure.

6. The steering gear of claim 5, wherein one of the linear displacement converter and the angular displacement converter is designed as a valve whose actuating part controls, as a function of the deflection angle, the flow of pressure medium from and to the control valve end chambers containing the end faces of the control valve spool.

7. The steering gear of claim 6, wherein the manual steering means includes a steering linkage, and the actuating part has a mechanical sensor for the position of a control cam, which is rigidly connected to the steering linkage.

8. The steering gear of claim 7, wherein the control cam is connected to a drop arm adapted for connection to a tie rod.

9. The steering gear of claim 6, wherein the actuating part can be actuated selectively by electrical or magnetic control pulses.

10. The steering gear of claim 9, wherein the control pulses can be generated by means of a potentiometer connected to a control column.

11. The steering gear of claim 3, wherein the end chambers are each connected to a common pressure medium source which is located between constant throttles and connected to a drain reservoir via throttle devices with adjustable throttle cross-sections such that each is adjusted in the opposite sense to the other at any selected moment.

12. The steering gear of claim 11, wherein the pressure of the control valve pressure medium return is increased in one section of a return line by means of a pressure control valve in that this section of the pipe acts as the common pressure medium source.

13. The steering gear of claim 11, wherein the pipes leading to the adjustable throttle devices can be interrupted by means of a switch-over valve.

14. The steering gear of claim 1, wherein the return device is installed in the steering gear of a track-guided vehicle.

* * * * *

UNITED STATES PATENT AND TRADEMARK OFFICE
CERTIFICATE OF CORRECTION

PATENT NO. : 4,595,071
DATED : June 17, 1986
INVENTOR(S) : Herbert Mehren

It is certified that error appears in the above-identified patent and that said Letters Patent is hereby corrected as shown below:

In Figures 1, 1A snd 1B, Valve 34 should appear as shown on the attached sheet.

In Figure 1, the area at the steering gear housing 2, should appear as shown on the attached sheet.

Signed and Sealed this

Fourteenth Day of October, 1986

[SEAL]

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,595,071
DATED : June 17, 1986
INVENTOR(S) : Herbert Mehren

It is certified that error appears in the above-identified patent and that said Letters Patent is hereby corrected as shown below:

In Figures 1, 1A and 1B, Valve 34 should appear as follows:

In Figure 1, the area at the steering gear housing 2 having a tooth segment 21 torsionally connected to a drop arm 22 which is pivotable about a pivot 80 should appear as follows: